US008566141B1

(12) United States Patent
Nagdev et al.

(10) Patent No.: US 8,566,141 B1
(45) Date of Patent: Oct. 22, 2013

(54) SYSTEM AND METHOD OF APPLYING CUSTOM LEAD GENERATION CRITERIA

(75) Inventors: Kanaya J. Nagdev, Redondo Beach, CA (US); Matthew R. Wells, Santa Monica, CA (US); Vincent J. Lewis, San Pedro, CA (US)

(73) Assignee: Lower My Bills, Inc., Santa Monica, CA (US)

( * ) Notice: Subject to any disclaimer, the term of this patent is extended or adjusted under 35 U.S.C. 154(b) by 1319 days.

(21) Appl. No.: 12/353,151

(22) Filed: Jan. 13, 2009

Related U.S. Application Data

(60) Provisional application No. 61/119,623, filed on Dec. 3, 2008.

(51) Int. Cl.
*G06Q 10/00* (2012.01)

(52) U.S. Cl.
USPC ............................................. 705/7.29

(58) Field of Classification Search
None
See application file for complete search history.

(56) References Cited

U.S. PATENT DOCUMENTS

| | | | |
|---|---|---|---|
| 6,078,892 A * | 6/2000 | Anderson et al. ............ 705/7.33 |
| 6,233,566 B1 * | 5/2001 | Levine et al. ................ 705/36 R |
| 6,385,594 B1 * | 5/2002 | Lebda et al. .................... 705/38 |
| 7,096,205 B2 * | 8/2006 | Hansen et al. .................... 705/74 |
| 7,228,284 B1 * | 6/2007 | Vaillancourt et al. ........ 705/7.13 |
| 7,277,875 B2 * | 10/2007 | Serrano-Morales et al. ... 706/47 |
| 7,305,364 B2 * | 12/2007 | Nabe et al. ...................... 705/37 |
| 7,630,933 B2 * | 12/2009 | Peterson et al. ................. 705/38 |
| 7,657,569 B1 * | 2/2010 | Semprevivo et al. .. 707/999.107 |
| 7,672,865 B2 | 3/2010 | Kumar et al. |
| 7,752,054 B1 * | 7/2010 | Anthony-Hoppe et al. ... 705/1.1 |
| 7,752,236 B2 * | 7/2010 | Williams et al. .............. 707/804 |
| 7,778,885 B1 * | 8/2010 | Semprevivo et al. ........ 705/26.1 |
| 7,801,843 B2 * | 9/2010 | Kumar et al. .................... 706/61 |
| 7,962,347 B2 * | 6/2011 | Anthony-Hoppe et al. ... 705/1.1 |
| 7,970,690 B2 * | 6/2011 | Diana et al. ...................... 705/37 |
| 8,135,607 B2 * | 3/2012 | Williams et al. ............. 705/7.31 |
| 8,214,262 B1 * | 7/2012 | Semprevivo et al. ........ 705/26.1 |
| 8,275,662 B2 * | 9/2012 | Wilson ........................ 705/14.54 |
| 8,392,294 B2 * | 3/2013 | Mac Innis ........................ 705/28 |
| 2002/0059095 A1 * | 5/2002 | Cook .............................. 705/10 |
| 2002/0194050 A1 * | 12/2002 | Nabe et al. ...................... 705/10 |
| 2003/0172002 A1 * | 9/2003 | Spira et al. ...................... 705/27 |
| 2005/0044036 A1 * | 2/2005 | Harrington et al. ............. 705/38 |
| 2005/0131760 A1 * | 6/2005 | Manning et al. ................. 705/14 |

(Continued)

OTHER PUBLICATIONS lowermybills 11102007. Series of screenshots from webarchive.org for the website lowermybills.com on Nov. 10, 2007.*

*Primary Examiner* — Brett Feeney
(74) *Attorney, Agent, or Firm* — Knobbe Martens Olson & Bear LLP

(57) ABSTRACT

A computer system for applying custom lead generation criteria comprises vendor criteria data, vendor custom criteria data, vendor plan data, and computer hardware that executes software components that cause a computer processor to: (1) receive consumer data about a consumer; (2) choose standard criteria, custom criteria, or both standard criteria and custom criteria that are to be applied to the consumer data to match the consumer with one or more vendors that are to receive a lead for the consumer; (3) apply the chosen standard criteria, custom criteria, or both standard criteria and custom criteria to the consumer data and to match the consumer with one or more vendors that are to receive a lead for the consumer; (4) generate a lead comprising at least a portion of the consumer data; and (5) transmit the lead to the matched vendors.

20 Claims, 6 Drawing Sheets

(56) References Cited

U.S. PATENT DOCUMENTS

| | | | |
|---|---|---|---|
| 2005/0187860 A1* | 8/2005 | Peterson et al. | 705/38 |
| 2006/0100944 A1* | 5/2006 | Reddin et al. | 705/35 |
| 2006/0265259 A1* | 11/2006 | Diana et al. | 705/7 |
| 2007/0067234 A1* | 3/2007 | Beech | 705/38 |
| 2007/0239721 A1* | 10/2007 | Ullman et al. | 707/9 |
| 2008/0103960 A1* | 5/2008 | Sweeney | 705/38 |
| 2008/0109444 A1* | 5/2008 | Williams et al. | 707/10 |
| 2008/0109445 A1* | 5/2008 | Williams et al. | 707/10 |
| 2010/0023447 A1* | 1/2010 | Mac Innis | 705/38 |

* cited by examiner

SYSTEM AND METHOD OF APPLYING CUSTOM LEAD GENERATION CRITERIA

RELATED APPLICATIONS

This application claims priority to U.S. Provisional Application No. 61/119,623, entitled SYSTEM AND METHOD OF APPLYING CUSTOM LEAD GENERATION CRITERIA, which was filed on Dec. 3, 2008. This application relates generally to lead generation. Other applications that relate generally to lead generation include U.S. patent application Ser. No. 11/633,662, entitled SYSTEM AND METHOD OF ENHANCING LEADS, which was filed on Dec. 4, 2006 and is pending, U.S. patent application Ser. No. 11/683,688, entitled SYSTEM AND METHOD OF REMOVING DUPLICATE LEADS, which was filed on Mar. 8, 2007 and is pending, and U.S. patent application Ser. No. 12/139,285, entitled SYSTEM AND METHOD OF GENERATING EXISTING CUSTOMER LEADS, which was filed on Jun. 13, 2008 and is pending. The disclosures of the afore-mentioned applications are hereby incorporated by reference into this application.

BACKGROUND OF THE INVENTION

1. Field of the Invention

Embodiments of the systems and methods described herein relate to applying custom lead generation criteria.

2. Description of the Related Art

Consumer lead generation is a large and growing industry. The lead generation industry identifies individual or business consumers that may be interested in buying products or services and sells contact information for those consumers to providers of the products or services. For example, a residential loan lead generation company, such as LowerMyBills.com, identifies consumers interested in getting a residential loan and sells the consumers' contact information to lenders of residential loans. Contact information or other information about a potentially interested buyer that a vendor may use to try to engage in a transaction with the potentially interested buyer is known as a "lead."

Lead generation companies sell leads for many products and services, including residential loans, commercial loans, real estate agents, automobiles, attorneys, housecleaners, and many other products and services. Providers of such products and services buy leads because leads effectively identify consumers that are already interested in the providers' products and services. Accordingly, leads often result in more sales than advertising, cold calling, or other forms of salesmanship.

Some lead generation systems use standard criteria to match consumers with vendors. Standard criteria are generally available to multiple vendors to specify what kinds of leads the vendors want to receive from a lead generation system. Examples of standard criteria include geographic information such as city and state. In many systems, multiple vendors can use geographic criteria to specify, for example, that the vendors want to receive leads of consumers in particular geographic areas. While some lead generation systems have used such standard criteria, lead generation systems have not provided adequate mechanisms for a particular vendor to use custom criteria customized for use by the particular vendor.

SUMMARY

In this application we describe embodiments of systems and methods that are able to apply custom lead generation criteria in order to match consumers with particular vendors. Embodiments of the systems and methods allow vendors to specify criteria that define the types of leads that the vendors want to receive. For example, a vendor can define a standard criterion indicating that the vendor wants to receive leads of consumers having an excellent credit score and annual income above $100,000.

In an embodiment, the criteria can be standard criteria, custom criteria, or a combination of standard criteria and custom criteria. Standard criteria comprise common attributes that can be used by multiple vendors to define what types of leads the vendors want to receive. For example, one standard criterion is an income threshold. Some vendors may specify as part of their standard criteria that they want to receive leads for consumers having income above $100,000, while other vendors may specify that they want to receive leads for consumers having income between $25,000 and $100,000. Still other vendors may not use income threshold as one of their criteria, such that they are willing to receive leads for consumers regardless of income so long as the vendors' other criteria are met.

As used herein, the phrase "custom criteria" encompasses each and all three of the following types of criteria: (1) criteria that are made available for use by some but not all vendors, (2) criteria that are not as commonly used across an industry but that may be used by one or more individual vendors, and (3) criteria that are based on data or methods of data interpretation that are unique or atypical in an industry. For example, in the context of lending, a lender may make credit qualification decisions based on a custom credit score in place of or in addition to a traditional FICO credit score. Because such custom criteria are not generally used across an industry, but are used only by one or a few vendors, they are harder to implement within a lead generation system that serves multiple vendors. However, the systems and methods described herein provide the ability to use custom criteria only for the vendors to which they apply, without applying the custom criteria to vendors who choose not to use the custom criteria, and without adversely affecting the vendors' use of standard criteria.

We generally use the phrase "custom criteria" in a broad sense to encompass each and all three of the types of custom criteria set forth above. It will be appreciated, however, that the embodiments set forth herein or apparent to a skilled artisan in light of this disclosure may use, but are not required to use, a more restricted scope of custom criteria. For example, the embodiments disclosed herein can use, but are not required to use, only criteria that are based on data or methods of data interpretation that are unique or atypical in an industry. Such criteria may be referred to as "atypical custom criteria." Alternatively or additionally, the embodiments disclosed herein can use, but are not required to use, only criteria that are not as commonly used across an industry but that may be used by one or more individual vendors. Such criteria may be referred to as "uncommon custom criteria." Alternatively or additionally, the embodiments disclosed herein can use, but are not required to use, only criteria that are made available for use by some but not all vendors. Such criteria may be referred to as "exclusive-use custom criteria." It will be appreciated that, unless otherwise specified, the phrase "custom criteria" encompasses any one, two, or all three of the categories of "atypical custom criteria," "uncommon custom criteria," and "exclusive-use custom criteria."

In some embodiments, custom criteria are used to match consumers with vendors. Alternatively or additionally, custom criteria may be used to determine which data to provide to vendors. For example, a vendor may want to have a custom calculation performed (such as a custom credit score) and have the results of the calculation included in any leads that the vendor receives, without necessarily using the results of the calculation as part of the matching process.

In some embodiments, a vendor can have multiple plans that each define a level of service that the vendor receives from a lead generator. A plan can, for example, define criteria for matching a consumer with the vendor, number of leads to be sent to the vendor, vendor priority in receiving leads, type of information provided in the leads, how much the vendor pays for each type of lead. Preferably, a vendor can have some plans that use custom criteria (by itself or in combination with standard criteria) and other plans that use only standard criteria.

One custom lead generation system comprises a database of general vendor criteria, a database of custom vendor criteria, a matching engine, and a criteria engine that executes logic for determining which criteria is to be used to match consumers to a vendor under a particular vendor plan. If the criteria engine determines that a custom criteria exists for a particular vendor under a particular plan, the criteria engine causes the matching engine to execute the appropriate custom criteria as part of the process of matching consumers to the vendor. Advantageously, the criteria engine is able to cause custom criteria to be executed for vendors to which the custom criteria applies and to cause standard criteria to be executed for vendors to which the custom criteria does not apply.

Herein we describe examples or embodiments of systems and methods to apply custom criteria such that a skilled artisan will understand a few different ways to make and use the invention. However, the invention is not limited to just the described embodiments. Rather, the invention encompasses each disclosed embodiment individually, any combination or subset of the disclosed embodiments, and any variation of the disclosed embodiments that is appreciated by a skilled artisan in light of this disclosure. For example, while we describe many advantageous features and components, a skilled artisan will appreciate, in light of this disclosure, that these features and components are not necessary parts of every embodiment, but can be omitted from or changed in some embodiments.

DETAILED DESCRIPTION OF PREFERRED EMBODIMENTS

Figure 1:
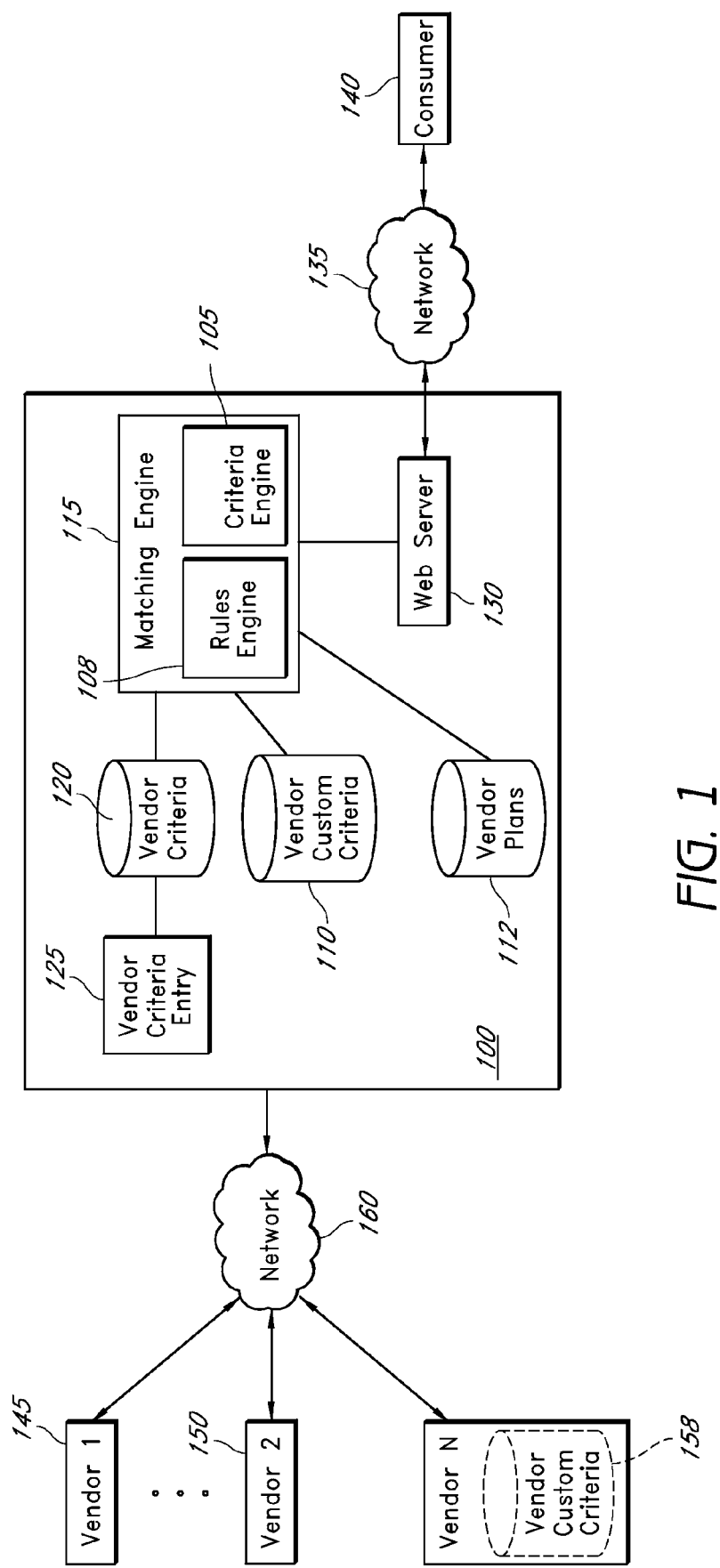
FIG. 1 is a block diagram that illustrates one implementation of a custom lead generation system connected to a network.

FIG. 1 is a block diagram that illustrates one implementation of a custom lead generation system connected to a network. The custom lead generation system 100 of FIG. 1, and the embodiments of other figures, may be implemented in the context of a loan lead generation system such as the system embodied at the web site www.lowermybills.com. We offer this context to illustrate one concrete application of the custom lead generation system 100 in order to help a skilled artisan understand how the custom lead generation system 100 may be used in practice. The invention, however, is not limited to generating custom leads for the lending industry. Rather, a skilled artisan will appreciate, in light of this disclosure, that the systems and methods described herein can be used to generate leads using custom criteria for any industry, including, without limitation, residential loans, commercial loans, insurance, education, credit cards, real estate agents, automobiles and automobile insurance, attorneys, housecleaners, or any other product or service. The term "vendor" refers broadly to any potential lead buyer, of whatever industry, that offers one or more products or services.

To further illustrate a concrete application of the custom lead generation system 100, we describe the custom lead generation system 100 in the context of a lead generation system that generates leads using the Internet. An example of such a lead generation system is found on the web site located at www.lowermybills.com. This site prompts a consumer interested in obtaining a loan to enter his own contact information into a web-based form and sends the contact information to a group of matched lenders.

In one embodiment, components of an Internet-based lead generation system include a matching engine 115, a vendor criteria database 120, a vendor custom criteria database 110, a vendor plans database 112, a vendor criteria entry component 125, and a web server 130. In general, the lead generation system generates a lead when a consumer 140 accesses the web server 130 over a network 135 such as the Internet. The web server 130 serves web pages that prompt the consumer 140 to enter his contact information into a web-based form. The consumer 140 may also be prompted to enter other information to assist the system to match the consumer 140 with vendors that offer the products or services that the consumer 140 wants.

In one embodiment, the components of the system, including the matching engine 115, the vendor criteria database 120, the vendor custom criteria database 110, the vendor plans database 112, the vendor criteria entry component 125, the web server 130, and any other component referenced herein or understood by a skilled artisan in light of this disclosure, are part of a computer system configured to perform the functions set forth herein. In one embodiment, the computer system comprises at least one computer that has computer hardware including at least a computer processor configured to execute computer-readable instructions. The computer system may also include memory, storage (such as, but not limited to, a hard disk drive), input and output devices (such as, but not limited to, a keyboard, mouse, or display), networking and communications devices for communicating with other computers or devices, and any other device or component that can be included in a computer system. In various embodiments, any of the processes and methods described herein are performed by a computer system. In such embodiments, one, more than one, or all of the functions set forth herein are defined by computer-readable instructions that, when executed by one or more computer processors, cause a computer to perform the defined functions.

Generally, the vendor criteria database 120 includes criteria that define characteristics of consumers with whom each vendor wants to be matched. In the context of lending, a lender's criteria may specify that the lender wants to be matched with consumers that have excellent credit and that seek a home purchase loan for more than $300,000. In the context of selling cars, a car dealer's criteria may specify that the dealer wants to be matched with consumers that want to buy a new Honda car with a Manufacturer's Suggested Retail Price of at least $15,000. Generally, the matching engine 115 compares characteristics of the consumer 140 with the vendor criteria database 120 to match the consumer 140 with one or more vendors. In some cases the consumer 140 may not meet any vendor's criteria and the matching engine 115 may not make a match.

Generally, the vendor custom criteria database 110 includes sets of custom criteria that are each customized for a particular vendor. For example, one set of custom criteria may be customized for Vendor A while another set of custom criteria may be customized for Vendor B. In a process of matching a consumer with vendors, the custom criteria for Vendor A may be referenced in order to determine whether the consumer is a match for Vendor A. Similarly, the custom criteria for Vendor B may be referenced in order to determine whether the consumer is a match for Vendor B. Preferably, the custom criteria for one vendor is not available to another vendor. For example, the custom criteria for Vendor A cannot be used by Vendor B in order to determine which consumers are a match for Vendor B. It will be appreciated, however, that it is possible that multiple vendors will define custom criteria that are similar to each other, or in which many variables overlap.

While custom criteria defined for one vendor may not typically be used by another vendor, a variation of the system allows multiple vendors to use the same custom criteria with the consent of each vendor. For example, in some embodiments, Vendor A may define a custom criteria and allow Vendor B to use the custom criteria. These shared custom criteria may be stored in the vendor custom criteria database 110 along with permissions or other rules defining which vendors are allowed to use the custom criteria. Preferably, the system allows each vendor that creates new custom criteria to determine whether and to what extent the vendor is willing to share the custom criteria. In addition, the system may allow a vendor to set limits on other vendors' use of the custom criteria or to require a payment for use of the custom criteria. The system may collect a fee for defining or using custom criteria. Preferably, the system includes software, hardware, and/or firmware components to implement the foregoing functions.

In addition or in place of the vendor custom criteria database 110, vendor custom criteria may be stored in a remote vendor custom criteria database 158. In one advantageous embodiment, the remote vendor custom criteria database 158 is located at a vendor site and can be operated by the vendor. In one embodiment, the system 100 includes one or more interfaces that communicate with the remote vendor custom criteria database 158 in order to determine if a consumer matches the vendor custom criteria stored in the remote vendor custom criteria database 158. Preferably, the interface communicates sufficient information about a consumer to the remote site such that the remote site can determine whether the criteria are met without sending a useable lead to the vendor.

In some embodiments, a vendor can have multiple plans that each define a level of service that the vendor receives from a lead generator. A plan can, for example, define criteria for matching a consumer with the vendor, number of leads to be sent to the vendor, vendor priority in receiving leads, type of information provided in the leads, how much the vendor pays for each type of lead. Preferably, a vendor can have some plans that use custom criteria (by itself or in combination with standard criteria) and other plans that use only standard criteria.

In embodiments that have vendor plans, data that defines each of the plans may be stored in the vendor plans database 112. Alternatively, or additionally, such data defining the plans may be stored as part of the vendor custom criteria database 110, the vendor criteria database 120, or both databases. When a vendor has multiple plans, the criteria engine 105 may use each of the multiple plans to determine if a consumer matches a vendor for any of the plans, and the system 100 may generate and transmit a lead to the vendor if the consumer matches the vendor under any of the plans. For example, if a vendor has a Plan A, a Plan B, and a Plan C, the criteria engine 105 may test the criteria for each of the plans, determine that the consumer matches the vendor under Plan B, and generate and transmit to the vendor a lead having the characteristics defined by Plan B. In some cases, a consumer may match a vendor under multiple plans, such as both Plan A and Plan B. In such cases, the criteria engine 105 may determine which plan characteristics to use in sending a lead to the vendor. For example, the criteria engine 105 may choose a plan that provides the most detailed information about the consumer to the vendor, a plan that provides the most income to the system operator, or a plan that provides the best match between the consumer and the vendor.

Allowing a vendor to have multiple plans is advantageous but not required. One advantage of allowing a vendor to have multiple plans is that it allows a vendor to more flexibly define the types of leads that the vendor wants to receive and the types of consumers for which the vendor wants to receive leads. Thus, for example, a vendor can have one plan for receiving leads with detailed information from consumers having excellent credit scores while having another plan for receiving leads with less detailed information from consumers having good but not excellent credit scores. The vendor may pay more for a plan in which the vendor receives more detailed information and may thus want to focus its resources on getting the most detailed information on the consumers with the best credit and who may be considered to be better business prospects.

Generally, the vendor criteria entry component 125 comprises computer-executable instructions stored on a computer-readable medium that are configured, when executed by a computer, to allow a user to update the vendor criteria database 120 or the vendor custom criteria database 110. Alternatively, the vendor criteria entry component 125 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "vendor criteria entry component" encompasses all of these implementations. In one embodiment, the vendor criteria entry component 125 is accessible to a plurality of vendors 145, 150, and 155 over a network 160, such that the vendors 145, 150, and 155 can directly update their own criteria. Alternatively, the vendor criteria entry component 125 is not accessible to the vendors 145, 150, and 155, such that a person or automated process affiliated with the lead generation system must update the vendor criteria database 120. The network 160 may or may not be the same network as the network 135.

Generally, the matching engine 115 comprises computer-executable instructions stored on a computer-readable medium that are configured, when executed by a computer, to match the consumer 140 to one or more vendors based on vendor criteria and characteristics of the consumer 140. Alternatively, the matching engine 115 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "matching engine" encompasses all of these implementations.

In one embodiment, the matching engine 115 matches the consumer 140 with vendors by comparing characteristics of the consumer 140 with vendor criteria stored in the vendor criteria database 120 or the vendor custom criteria database 110. The matching engine 115 may require an exact match (e.g. the consumer 140 meets all of a vendor's criteria) or the matching engine 115 may make matches that are close but not exact (e.g. the consumer 140 meets an acceptable level of the vendor's criteria). In some cases the matching engine 115 may match the consumer 140 with only one vendor, while in others the matching engine 115 may match the consumer 140 with multiple vendors. An advantage of matching with just one vendor is that the vendor gets an exclusive lead that likely has more value than a lead that the vendor shares with other vendors. An advantage of matching with multiple vendors is that the vendors may compete with each other to win the consumer's business, which may result in a better price for the consumer. In some cases, the matching engine 115 may not be able to make any matches because the consumer 140 may have characteristics that do not match any vendor's criteria.

The consumer 140 characteristics may be collected in many ways. One way to collect the consumer 140 characteristics is to have the consumer 140 fill out a web-based form served by the web server 130. The consumer 140 may be asked, for example, to provide his contact information and information about his creditworthiness, job, income, interests, and the like. In some cases the consumer 140 may be asked to estimate some of these characteristics rather than provide an exact value. A skilled artisan will appreciate, in light of this disclosure, that the characteristics requested differ on the type of lead that is being generated and the type of information that vendors care about for qualifying a consumer as a potential buyer. Thus, in the context of mortgage loans, creditworthiness is an important characteristic. However, in the context of a product such as a computer that the consumer 140 will likely purchase using cash or a credit card, creditworthiness is less important.

Another way to collect the consumer 140 characteristics is to look up information about the consumer 140 stored in a database. An example of this approach is to request a credit report for the consumer 140 after obtaining the Social Security number from the consumer 140. Still other ways to collect consumer 140 characteristics exist outside of the context of web-based lead generation systems. For example, the consumer 140 can be asked to fill out a paper form or to answer questions during a face-to-face or telephone survey or interview.

A web-based lead generation system, such as the example described above, is a preferred way to collect leads for sending to vendors. However, while we describe embodiments of a custom lead generation system 100 in the context of such a web-based lead generation system, the custom lead generation system 100 can be used to remove duplicate leads generated in other ways, including leads generated from paper forms or from face-to-face or telephone surveys or interviews. It is advantageous to use a computerized method of generating leads because such leads will already be stored in electronic form and can easily be compared to the vendor duplicates database 110 described herein. However, non-electronic leads can be manually or automatically converted (such as by optical character recognition or the like) into electronic form so that the custom lead generation system 100 can be used with them.

The illustrated custom lead generation system 100 also comprises a criteria engine 105. In the illustrated embodiment, the criteria engine 105 is a component of the matching engine 115. Alternatively, the criteria engine 105 can be separate from the matching engine 115. In one embodiment, the criteria engine 105 comprises computer-executable instructions stored on a computer-readable medium that are configured, when executed by a computer, to determine which criteria is to be used in order to determine if a consumer is a match with a vendor. Alternatively, the criteria engine 105 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "criteria engine" encompasses all of these implementations.

Generally, the criteria engine 105 applies at least the general vendor criteria stored in the vendor criteria database 120. As explained above, the general vendor criteria includes a general set of criteria that is made available by the system for use by any vendor to define which types of leads the vendor wants to receive. The general vendor criteria is not restricted to any particular vendor or vendors. The criteria engine 105 is also configured to determine whether any vendor custom criteria is to be applied. In one embodiment, the criteria engine 105 searches the vendor custom criteria database 110 and applies all custom criteria that are defined therein. For example, if custom criteria has been stored for Vendors A, B, and C, the criteria engine 105 applies Vendor A's custom criteria to determine if the consumer is a match for Vendor A, applies Vendor B's custom criteria to determine if the consumer is a match for Vendor B, and applies Vendor C's custom criteria to determine if the consumer is a match for Vendor C. Alternatively, the criteria engine 105 may apply logical rules to determine if a particular custom criteria needs to be applied. For example, a custom criteria for a particular vendor may be applied only when the standard criteria defined for a vendor has been met.

In one embodiment, once the criteria engine 105 has determined which vendor custom criteria should be run, the matching engine 115 executes the appropriate vendor custom criteria. In one embodiment, the actual vendor custom criteria is defined in computer-executable instructions that the matching engine 115 executes as part of its operation. Alternatively or additionally, the vendor custom criteria can be implemented in hardware, software, firmware, or a combination of hardware, software, and firmware. In one embodiment, the instructions for executing the vendor custom criteria are stored on the system 100. Alternatively or additionally, part or all of the instructions can be stored and executed at a remote site, such as a vendor site 145. For example, a vendor may prefer to have its custom criteria locally stored and to not provide the instructions for implementing the custom criteria to the operator of the system 100. In such case, an interface between the system 100 and the remote vendor site 145 may be established that allows the system 100 to communicate sufficient information to the vendor site 145 to allow the vendor site 145 to execute the vendor custom criteria in order to determine if the consumer is a match for the vendor. Preferably, such an interface allows the system 100 to communicate sufficient information to the vendor site 145 without transmitting a useable lead to the vendor.

It will be understood by a skilled artisan in view of this disclosure that certain exceptions to normal operation of the criteria engine 105 and the matching engine 115, as described above, may occur. Such exceptions or special cases may be handled by logic within the criteria engine 105 or the matching engine 115. Alternatively, the special cases may be identified and handled by a separate component. Herein, and as illustrated by FIG. 1, we refer to a component that identifies and handles such special cases as a "rules engine" 108. As with the other illustrated components, the rules engine 108 is an optional component of the system 100. The illustrated rules engine 108 is part of the matching engine 115, but it may also be a separate component. In one embodiment, the rules engine 108 comprises computer-executable instructions stored on a computer-readable medium that are configured, when executed by a computer, to identify and handle special cases in which additional processing may be performed in addition to or in place of the processing performed by the criteria engine 105. Alternatively, the rules engine 108 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "rules engine" encompasses all of these implementations.

In one embodiment, the rules engine 108 executes one or more rules to identify and to handle such special cases. For example, one special case in which the criteria engine 105 may not be executed for a vendor is when the vendor has already received a lead for a particular consumer. Thus, the rules engine 108 may have a rule indicating that the consumer is not to be matched with a vendor when the vendor has already received a lead for that consumer. In addition, the rules engine 108 may have a rule indicating that a consumer is not to be matched with a vendor when such a match would cause a conflict defined by the system 100. An example conflict that may invoke such a rule is when a consumer is matched with competing branches of the same national or regional vendor.

When a duplicate lead or a conflict is detected, the rules engine 108 may prevent further execution of the criteria engine 105 and the matching engine 115, or may cause the normal operation of the criteria engine 105 and the matching engine 115 to be altered, to ensure that the consumer is not matched with the vendor. The rules engine 108 may determine whether or not the vendor has already received a lead for a consumer by referring to output from a lead de-duplication system. The rules engine 108 may determine whether or not a match would cause a conflict by referring to output from a conflict resolution system. In one embodiment, the system 100 includes a suitable lead de-duplication and conflict resolution system to carry out such operations, such as, for example, the lead de-duplication and conflict resolution system described in U.S. patent application Ser. No. 11/683,688, entitled SYSTEM AND METHOD OF REMOVING DUPLICATE LEADS, which was filed on Mar. 8, 2007 and is pending. The disclosure of the foregoing application and, in particular, the drawings and description that describe the lead de-duplication and conflict resolution system described in the foregoing application, are hereby incorporated by reference into this application.

Special handling may also be performed for a consumer that is an existing customer of a vendor. Thus, the system 100 may include an existing customer lead generation system, such as is described in U.S. patent application Ser. No. 12/139,285, entitled SYSTEM AND METHOD OF GENERATING EXISTING CUSTOMER LEADS, which was filed on Jun. 13, 2008 as is pending. The disclosure of the foregoing application and, in particular, the drawings and description that describe an existing customer lead generation system in the foregoing application, are hereby incorporated by reference into this application.

In one embodiment, the system 100 may have the components and may perform the methods of enhancing leads described in U.S. patent application Ser. No. 11/633,662, entitled SYSTEM AND METHOD OF ENHANCING LEADS, which was filed on Dec. 4, 2006 and is pending. The disclosure of the foregoing application and, in particular, the drawings and description that describe systems and methods of enhancing leads, are hereby incorporated by reference into this application.

Figure 2:
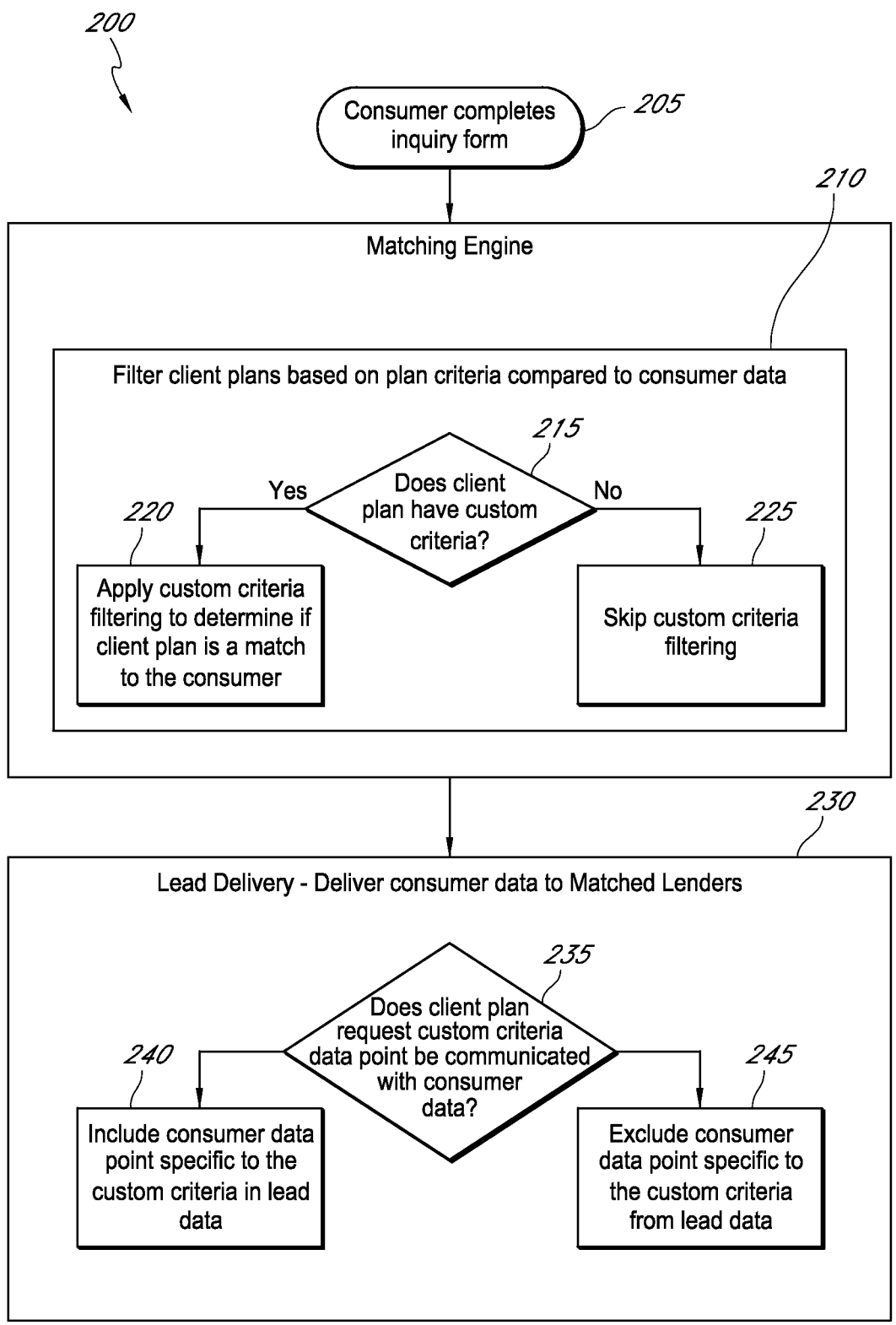
FIG. 2 is a flowchart that illustrates one process of applying vendor custom criteria.

FIG. 2 is a flowchart that illustrates one process of applying vendor custom criteria. A process 200 begins in a block 205 by receiving consumer information from a consumer that has completed an inquiry form. In a block 210, the process 200 filters vendor plans by comparing plan criteria with consumer data. A vendor plan includes information about the vendor criteria (both standard criteria and custom criteria), how many leads the vendor wants to receive, pricing for the leads the vendor is to receive, what information the vendor wants to be included in the leads, and the like. In a block 215, the process 200 determines if the vendor plan has custom criteria. If the vendor plan does have custom criteria, the process 200, in a block 220, applies the custom criteria to determine if the consumer is a match for the vendor. If the vendor plan does not have custom criteria, the process 200, in a block 225, skips custom criteria filtering.

In a block 230, the process 200 transmits leads to matched vendors. In a block 235, the process 200 determines if the vendor plan requests that a custom criteria data point be communicated in the lead. For example, if the custom criteria is a custom credit score, the vendor plan may include a request that a calculated custom credit score be included in the information transmitted with the lead. If the vendor plan does request that a custom criteria data point be communicated in the lead, the process 200, in a block 240, includes a consumer data point specific to the custom criteria in the lead. If the vendor plan does not request that a custom criteria data point be communicated in the lead, the process 200, in a block 245, excludes the consumer data point specific to the custom criteria.

Figure 3:
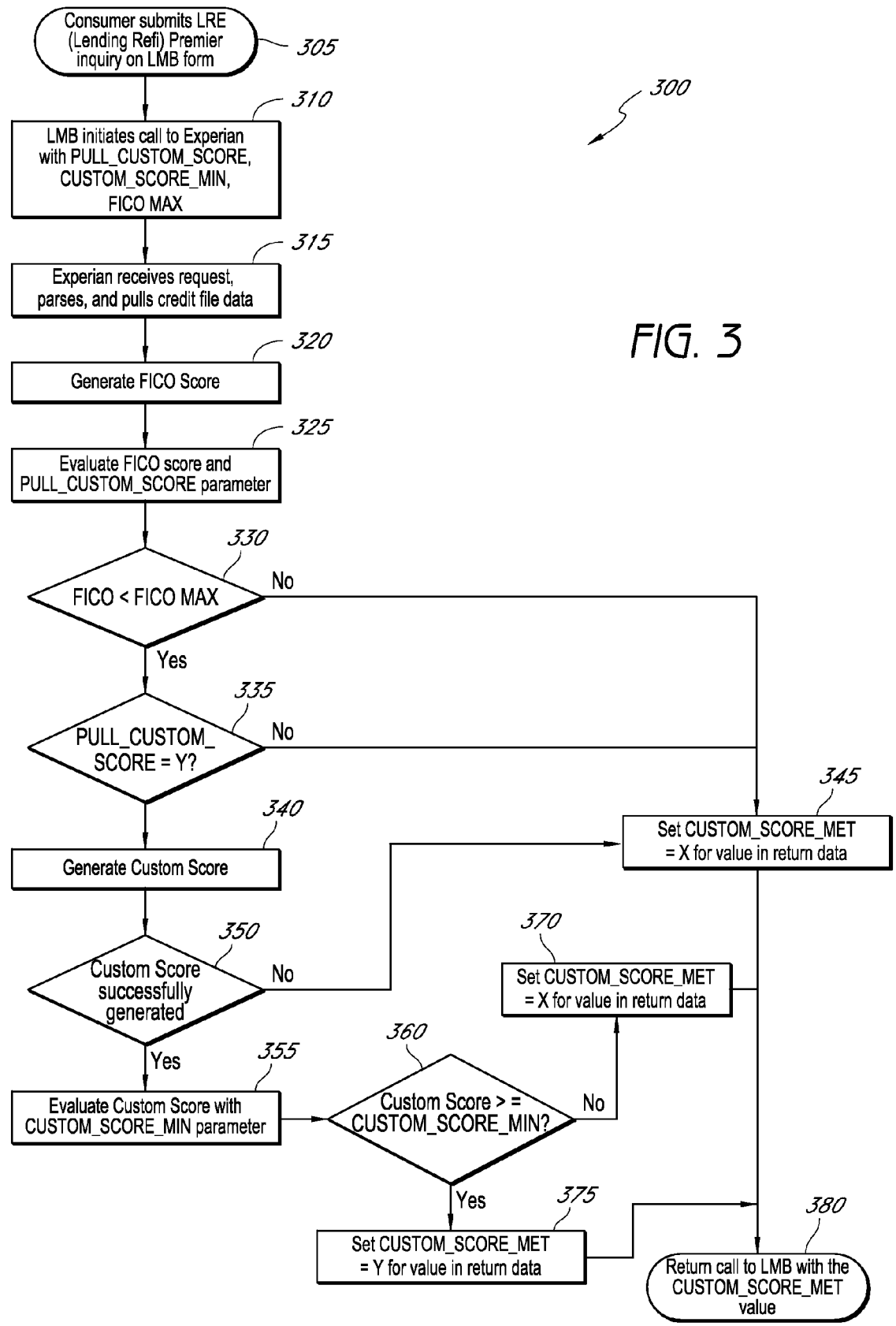
FIG. 3 is a flowchart that illustrates one process of applying a specific vendor custom criteria.

FIG. 3 is a flowchart that illustrates one process of applying a specific vendor custom criteria. In this example, the specific vendor custom criteria is a custom credit score. It will be appreciated that this is only one illustrative example of a vendor custom criteria and the invention is not limited to custom credit scores.

As will be appreciated, the most commonly calculated credit score is known as a FICO score generated using a formula maintained by Fair Isaac. The FICO score is a standard criterion used by the lending industry for determining credit-worthiness. As used herein, a custom credit score is a credit score generated by someone other than Fair Isaac and that uses a custom formula (e.g. not the Fair Isaac model) for calculating the custom credit score.

A process 300 begins, in a block 305, by receiving consumer information submitted by a consumer. In a block 310, the process 300 initiates a call that may result in requesting a custom credit score. The parameter PULL_CUSTOM_SCORE, when set to Y, is understood to be a request for generating a custom credit score that is calculated using principles understood in the art of credit scoring. The call also includes parameters CUSTOM_SCORE_MIN and FICO_MAX that signify a lowest acceptable custom credit score and a FICO score threshold that is used to determine whether it is necessary to generate a custom credit score. The FICO_MAX parameter is used, in one embodiment, because it has been observed that there are scenarios in which a FICO score is sufficiently high that it can be assumed that a consumer meets a vendor's criteria without going through the extra process of generating a custom credit score. The FICO_MAX threshold may vary from vendor to vendor depending on the strictness of each vendor's criteria.

In a block 315, the process 300 receives the request, parses the information contained therein, and pulls credit file data. The credit file data may be received from any credit bureau or other credit file data source, including, for example, one of the major credit bureaus of Experian, Equifax, or TransUnion. In a block 320, the process 300 generates a FICO score. As indicated above, a FICO score is the most commonly used credit score, and is a standard criterion used by the lending industry for determining credit-worthiness. In a block 325, the process 300 evaluates the FICO score and the PULL_CUSTOM_SCORE parameter. Specifically, in a block 330, the process 300 determines if the FICO score is less than FICO_MAX. One purpose of this determination is to determine if it is necessary to calculate a custom credit score in order to further assess the credit worthiness of the consumer. Experience suggests that there may be a high correlation between consumers who have a FICO score greater than or equal to the FICO_MAX threshold and those who have a custom score greater than or equal to CUSTOM_SCORE_MIN. It will be appreciated, however, that each vendor may choose a different FICO_MAX threshold and CUSTOM_SCORE_MIN value, and that the exact correlation will therefore differ depending on the vendor's strictness in assessing creditworthiness. For example, it is likely that a consumer that has a very high FICO score such as 750 or above would qualify using any custom credit score. Accordingly, the FICO_MAX parameter may be used by a vendor as a convenient mechanism to determine whether it is even necessary to perform the extra process of calculating a custom credit score. In one embodiment, for example, a vendor may decide to have a custom credit score calculated when the FICO score is less than 720, or less than 700, or less than 680, or less than 660, or less than any other FICO_MAX threshold chosen by the vendor.

Preferably, a vendor chooses the FICO_MAX threshold based on empirical data about what FICO threshold makes it a safe assumption that the consumer meets the vendor's specific credit-worthiness criteria. For example, a vendor may be willing to use a FICO_MAX threshold of 680 if it has been determined that a high percentage of consumers with a FICO score at or above 680 also have a custom credit score that meets the vendor's credit-worthiness standards. The high percentage may be 99 percent, 98 percent, 97 percent, 96 percent, 95 percent, or any other percentage that is acceptable to the vendor. Similarly, a vendor may choose a FICO_MAX threshold of 650 if a high percentage of consumer with a FICO score at or above 650 also have a custom credit score that meets the vendor's credit-worthiness standards. It will be appreciated by a skilled artisan in light of this disclosure that both the FICO_MAX threshold and the CUSTOM_SCORE_MIN value differs from vendor to vendor depending on the strictness of each vendor's credit-worthiness criteria.

It is generally advantageous to allow a vendor to set a FICO_MAX threshold in order to prevent the system from performing unnecessary calculations for calculating a custom score in situations where the FICO score is high enough to assume that the consumer also meets the vendor's criteria using the custom score. For this reason, in the illustrated example, if the FICO score is greater than or equal to FICO_MAX, as determined in the block 330, the process 300 does not generate a custom credit score, but instead sets a CUSTOM_SCORE_MET parameter to X to signify that the custom credit score was not generated.

If the FICO score is less than FICO_MAX, it may be advantageous to check the custom credit score in order to obtain a supplemental data point that may be used to make a better decision about a consumer's creditworthiness. Accordingly, in a block 335, the process 300 determines if the PULL_CUSTOM_SCORE parameter is equal to Y. If it is equal to Y, the process 300 proceeds, in a block 340, to generate the custom credit score. Otherwise the process 300 proceeds, in the block 345, to set the CUSTOM_SCORE_MET parameter to X to signify that the custom credit score was not generated.

After proceeding to the block 340, the process 300 proceeds, in a block 350, to determine if the custom credit score was successfully generated. If the custom credit score was not successfully generated, the process 300 proceeds, in the block 345, to set the CUSTOM_SCORE_MET parameter to X to signify that the custom credit score was not generated. If the custom credit score was successfully generated, the process 300 proceeds, in a block 355 to evaluate the custom credit score in comparison to the CUSTOM_SCORE_MIN parameter. In a block 360, the process 300 determines if the custom credit score is greater than or equal to the CUSTOM_SCORE_MIN parameter. If the custom credit score is greater than or equal to the parameter, the process 300 proceeds, in a block 375, to set the CUSTOM_SCORE_MET parameter to Y to signify that the custom credit score meets the requirements for creditworthiness. If the custom credit score does not meet the minimum requirement, the process 300 proceeds, in a block 370, to set the CUSTOM_SCORE_MET parameter to N to signify that the custom credit score does not meet the requirements for creditworthiness. In either case, the process 300 then proceeds, in a block 380, to return the call with consumer information, including the value of the CUSTOM_SCORE_MET parameter.

Advantageously, by obtaining a custom credit score, in addition to a traditional FICO score, the system 100 can apply custom criteria that depends upon a vendor's custom credit score in order to determine whether a consumer is a match for a vendor. In this way, the system 100 can ensure that the leads transmitted to a particular vendor more accurately meet the vendor's desires about which leads it wants to receive. Systems that use only standard criteria, such as FICO scores, loan to value ratios, income levels, and the like, cannot perform filtering with such precision customized to the specific criteria of the vendor.

One particular advantage of using a custom credit score in addition to the FICO score is that the custom model may be fine-tuned to identify consumers that fall below an excellent credit score under the FICO model but that are nonetheless good credit risks for a specific vendor under the vendor's specific underwriting criteria. Specifically, the custom model may more accurately distinguish between good and bad credit risks for consumers that are in the fair and good ranges of the FICO model. Advantageously, by using a custom credit score to supplement FICO scores, a vendor may be able to offer loans to more consumers without significantly increasing the risk of default.

Figure 4:
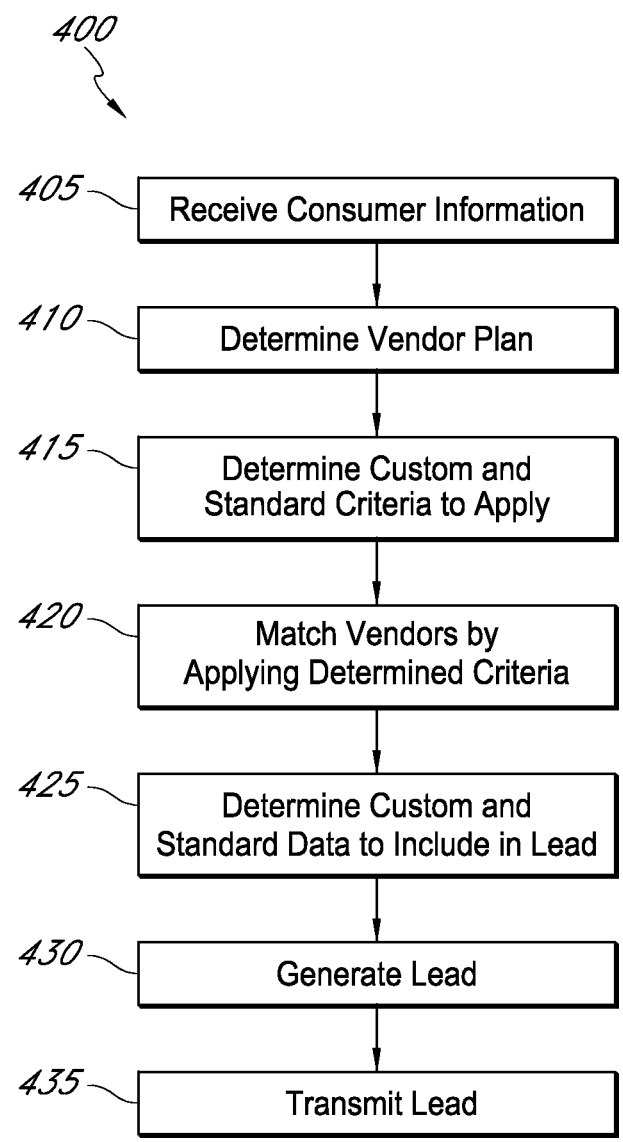
FIG. 4 is a flowchart that illustrates another process of applying vendor custom criteria.

FIG. 4 is a flowchart that illustrates another process of applying vendor custom criteria. In one embodiment, a process 400 begins, in a block 405, by receiving consumer information. In a block 410, the process 400 determines a vendor plan to be used for determining whether a consumer matches a vendor. As indicated above, a vendor plan may define which specific criteria is to be used to determine if the consumer is a match, which information is to be transmitted to the vendor, how much money a vendor must pay for a lead under the plan, and the like. In one embodiment, determining a vendor plan includes selecting a vendor plan from among a plurality of plans for a vendor. For example, one vendor plan may be applied if it is determined that the consumer is an existing customer of the vendor, while a different vendor plan may be used if the consumer is not an existing customer. As will be appreciated by a skilled artisan, a preprocessing step may be performed in order to determine which vendor plan is appropriate. For example, a portion of a vendor's criteria may be evaluated to choose the vendor plan, such as by using one vendor plan for consumers that have an excellent credit score while using a different vendor plan for consumers that have a good but not excellent credit score. In one embodiment, determining a vendor plan includes determining a vendor plan for each of a plurality of vendors.

In a block 415, the process 400 determines custom and standard criteria to apply. In one embodiment, the determination of which custom and standard criteria to apply is at least partially defined by the vendor plan. Alternatively or additionally, some criteria may first be evaluated in order to determine if additional criteria is to be applied. For example, in one embodiment, standard criteria such as estimated value of a property may be evaluated in deciding whether it is necessary to use custom criteria. A vendor could desire, for example, to execute a custom automated valuation model only for properties for which the consumer has provided a high estimated value of the property. In such a case, the custom automated valuation model could provide additional verification of the accuracy of the consumer's estimated value of the property, though the vendor may choose not to rely entirely on the custom automated valuation model. In some cases, the process 400 may determine to apply only standard criteria, only custom criteria, or both standard and custom criteria. In addition, it will be appreciated that the determined criteria for one vendor may differ from the determined criteria for another vendor.

In a block 420, the process 400 matches vendors with the consumer by applying the determined criteria. In one embodiment, the application of the criteria is performed by the system 100. Alternatively or additionally, the application of the criteria may be performed at a vendor site. The application of the criteria may be performed by the system 100 for some vendors and at a vendor site for other vendors. In one embodiment, the matching of vendors includes selecting a subset of matched vendors to whom to transmit a lead. Selecting a subset of matched vendors may be performed by the system 100 by, for example, determining which subset of vendors will result in the highest profit to the operator of the system 100. Alternatively or additionally, the consumer may have some input into the selection of the subset of matched vendors.

In a block 425, the process 400 determines custom and standard data to include in a lead to be transmitted to the matched vendors. The type of data to be included in a lead for each matched vendor may be determined, at least in part, by the vendor plan under which the vendor has been matched with the consumer. Standard data that is typically included in any lead includes contact information sufficient for the vendor to contact the consumer. Custom information that may be included for vendors that use custom criteria includes custom propensity scores, custom credit scores, values calculated by a custom automated valuation model, and the like. Advantageously, such enhanced data can be exploited by the vendor to better manage the lead and improve the vendor's chances of obtaining business through the lead.

In a block 430, the process 400 generates the leads to be transmitted to the matched vendors. In a block 435, the process 400 transmits the leads to the matched vendors.

Figure 5:
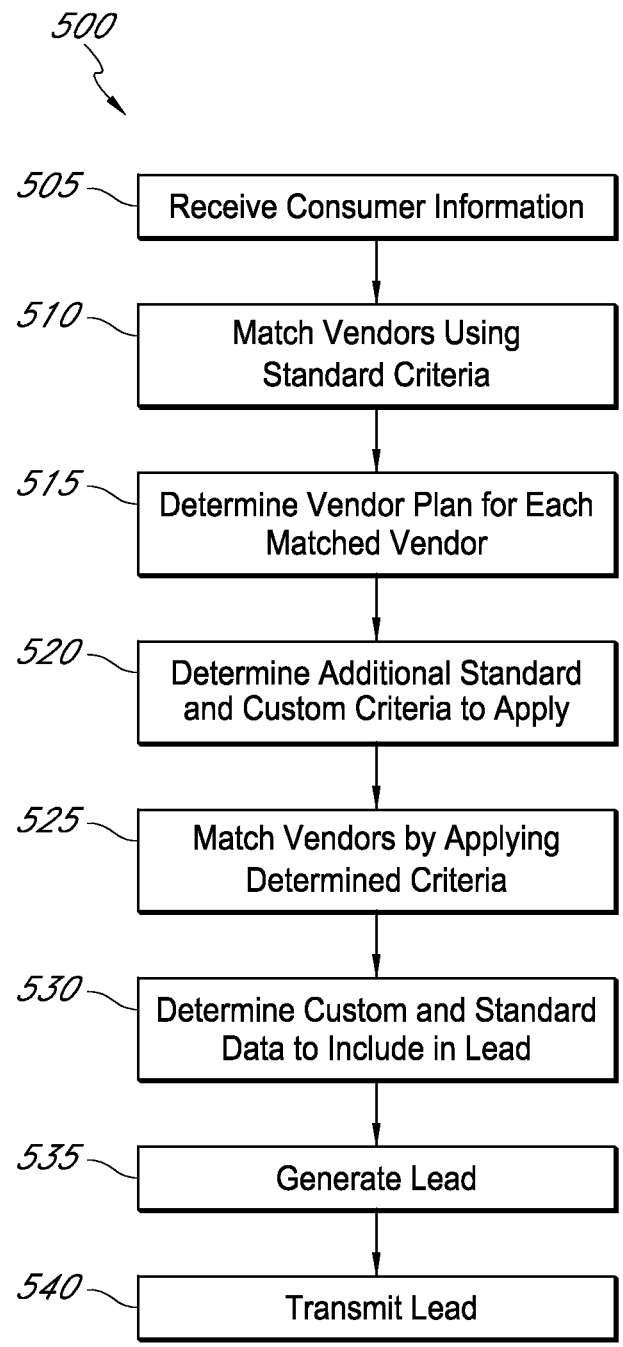
FIG. 5 is a flowchart that illustrates another process of applying vendor custom criteria.

FIG. 5 is a flowchart that illustrates another process of applying vendor custom criteria. In one embodiment, a process 500 begins, in a block 505, by receiving consumer information. In a block 510, the process 500 matches a consumer to vendors using standard criteria. In this embodiment, the matching of a consumer to vendors using standard criteria may operate as a prescreen step that filters out consumers that definitely are not a match for a vendor before any further processing is performed. In a block 515, the process 500 determines one or more vendor plans to apply for each matched vendor. In one embodiment, more than one vendor plan may be applied for any matched vendor, with the most advantageous plan being chosen if the consumer is a match for the vendor under more than one vendor plan.

In a block 520, the process 500 determines additional standard and custom criteria to apply. The same options for determining standard and custom criteria that are available with respect to the block 415 of FIG. 4 are also available for the determination performed in the block 520. It will be appreciated, however, that the previous matching of the vendors using standard criteria in block 510 may influence which, if any, additional standard or custom criteria is to be applied. For example, in one embodiment the matched vendors of block 510 may be matched based primarily on the standard criterion of loan-to-value ratio. In such case, a vendor may desire to have a particular custom criterion applied when the loan-to-value ratio is high but to have a different custom criterion, or another standard criterion, applied when the loan-to-value ratio is low. In one embodiment, therefore, the determination of additional standard and custom criteria to apply takes into account any information obtained in the application of the standard criteria in the block 510.

In a block 525, the process 500 matches vendors by applying the determined custom and/or standard criteria. The options available in the matching operation of block 420 of FIG. 4 are also available in the matching operation of block 525. Generally, the vendors matched in the block 525 are a subset of the vendors matched in the block 510. In a block 530, the process 500 determines custom and standard data to include in the leads to be transmitted to the matched vendors. The options available in the similar operation set forth with respect to the block 425 of FIG. 4 are also available in the operation of the block 530. In a block 535, the process 500 generates a lead to be transmitted to each matched vendor. In a block 540, the process 500 transmits the leads to the matched vendors.

Figure 6:
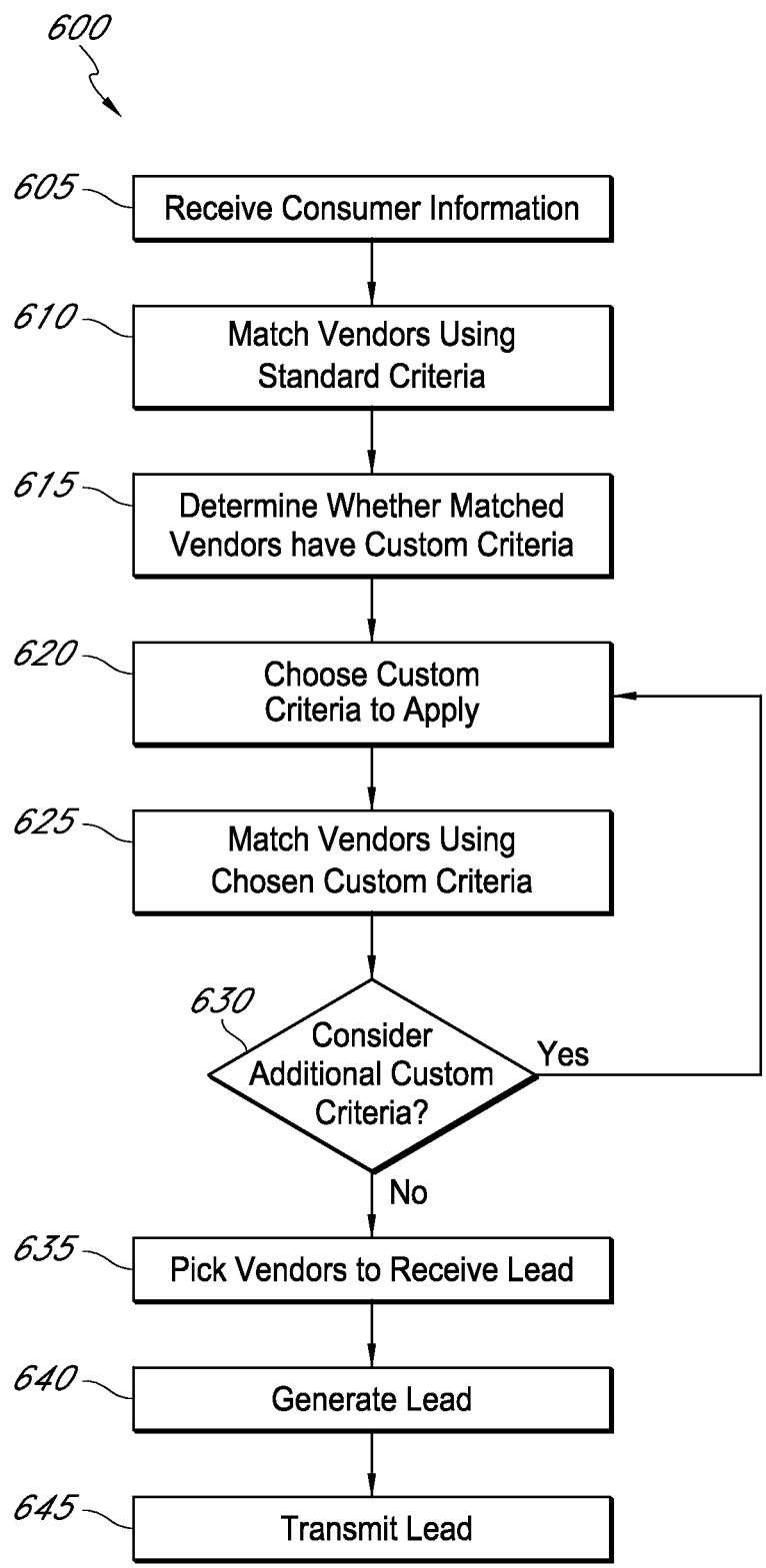
FIG. 6 is a flowchart that illustrates another process of applying vendor custom criteria.

FIG. 6 is a flowchart that illustrates another process of applying vendor custom criteria. A process 600 begins, in a block 605, by receiving consumer information, in a manner equivalent to or similar to the receiving operations 405 and 505 of the FIGS. 4 and 5. In a block 610, the process 600 matches vendors using standard criteria, in a manner equivalent to or similar to the matching operation 510 of FIG. 5. In a block 615, the process 600 determines whether the matched vendors have custom criteria. It may be determined, in the block 615, that one or more vendors have more than one set of custom criteria. Accordingly, in a block 620, the process 600 chooses a set of custom criteria to apply. In one embodiment, the process 600 chooses the set of custom criteria associated with a vendor plan that would provide the vendor with the most detailed information about the consumer. Alternatively, the process 600 may choose the set of custom criteria that, if satisfied, would result in generating a lead for which the operator of the system 100 would make the highest profit. Any other basis for choosing the set of custom criteria may also be employed.

In a block 625, the process 600 matches vendors using the chosen custom criteria, in a manner equivalent or similar to the matching operation 525 of FIG. 5. In a decision block 630, the process 600 determines whether to consider any additional custom criteria. In one embodiment, the determination of whether to consider additional custom criteria depends on whether additional custom criteria is available and whether the vendor has already been matched to the consumer based on the custom criteria that has already been applied. In one embodiment, the process 600 does not consider additional custom criteria when the vendor has already been matched to the consumer. Alternatively, the process 600 may still consider additional custom criteria when the vendor has already been matched to the consumer in order to try to find a match under a different vendor plan that may be more beneficial to the vendor or the operator of the system 100.

If it is determined, in the decision block 630, to consider additional custom criteria, the process 600 returns to the block 620 in order to choose the additional custom criteria. If it determined to not consider additional custom criteria, the process 600 proceeds, in a block 635, to pick specific vendors to receive the lead. In one embodiment, the specific vendors that are picked are a subset of all of the matched vendors. In one embodiment, the system 100 picks the subset so as to maximize the profit of the operator of the system 100. Alternatively or additionally, the consumer may participate in picking the subset of vendors.

In a block 640, the process 600 generates leads for the vendors to whom the leads are to be transmitted, in a manner equivalent to or similar to the generation operation 535 of FIG. 5. In a block 645, the process 600 transmits the leads to the vendors picked to receive the leads, in a manner equivalent to or similar to the transmission operation 540 of FIG. 5.

In one embodiment, the operator of the system 100, such as a credit bureau like Experian, performs the computations (such as calculating a custom credit score) that are needed for determining if the vendor's custom criteria has been met. Advantageously, if the operator of the system 100 is associated with a credit bureau, performs the necessary calculations, and determines if the vendor criteria is met, the system 100 minimizes the number of accesses to a consumer's credit file. Indeed, in many cases the operations of the system 100 can be performed while requiring only one access of a consumer's credit file. Alternatively, a vendor site can perform all or part of the computations. In one embodiment, for example, the system 100 transmits sufficient information to vendor site and the vendor site performs the calculations. In an embodiment in which the vendor site performs some or all of the calculations, the vendor site may transmit some or all of the calculated results back to the system 100 such that the system 100 can apply the custom vendor criteria to determine if the consumer is a match for the vendor.

Advantageously, the ability to use custom criteria in the manner described herein allows individual vendors to be matched with consumer leads more precisely than may be possible using only standard criteria. Each custom criterion may be made available to one vendor or to a plurality of vendors. Advantageously, a vendor is not required to use custom criteria. A vendor may choose not to use a custom criterion for many reasons, including, for example, that the perceived cost or added complexity of using the custom criterion may outweigh the perceived benefit. Another reason that a vendor may choose not to use a custom criterion is that the particular custom criterion may not be a viable method for matching customer leads with the vendor.

As indicated above, the invention is not limited to just providing custom credit scores. Rather, embodiments of the systems and methods described herein encompass providing a large number and variety of custom vendor criteria. In one embodiment, multiple models of vendor custom criteria are stored on and executed by the system 100. For example, vendor custom criteria may include custom credit score models (as described), custom models based on other credit information in a consumer's credit file, custom models based on title data, and the like.

In one embodiment, the custom criteria include a custom propensity score that indicates a consumer's propensity to engage in a particular behavior. For example, the custom propensity score may indicate the degree of likelihood that a consumer will respond to a vendor's attempt to sell a product or service that is offered by a vendor. Such a custom propensity score may allow a vendor to prioritize the leads that the vendor receives so as to, for example, offer products or services to consumers that are 30% likely to respond to the offer before offering the products or services to consumers that are only 10% likely to respond to the offer. The vendor can take advantage of a custom propensity score in at least two ways: (1) by including the custom propensity score as one part of the vendor's criteria, such that the vendor only receives leads for which the consumer's propensity score is above an acceptable threshold and (2) by receiving the propensity score within a lead and using the score to determine what effort and resources to devote to trying to conduct business with the consumer.

Another type of custom propensity score that may be employed in a vendor's custom criteria is a custom prepayment score for a mortgage or other loan. A skilled artisan will appreciate that a vendor of mortgages generally makes less money when a consumer prepays the mortgage. Accordingly, a custom propensity score may be incorporated into a vendor's custom criteria in order to allow the vendor to either screen out consumers that are likely to prepay or to at least be made aware of a consumer's propensity to prepay so that the vendor can determine what effort and resources to devote to trying to conduct business with the consumer. The vendor may, for example, decide to only offer to a consumer a mortgage with a prepayment penalty if the prepayment score shows that the consumer has a high propensity to prepay the mortgage. A prepayment score model that may advantageously employed with the systems and methods described herein is described in U.S. Pat. No. 6,185,543, entitled METHOD AND APPARATUS FOR DETERMINING LOAN PREPAYMENT SCORES, which was filed on May 15, 1998.

Another type of custom propensity score that may be employed in a vendor's custom criteria is a score that indicates the propensity for a consumer to remain loyal to a vendor. Such a score may be particularly useful for a vendor that offers goods or services that a consumer periodically purchases or renews, such as, for example, cell phone service. In such a case, the value of conducting business with the consumer may be determined in large part by the expectation that the vendor can obtain an ongoing stream of revenue from future sales or renewals from the same consumer. Accordingly, a vendor may include such a custom propensity score in the vendor's custom criteria in order to exclude consumers that are likely to periodically shop for replacement goods or services rather than to remain loyal to a single brand for a long time.

In one embodiment, the custom criteria include a custom automated valuation model that is used to provide an estimate of the value of an asset. The custom valuation model may, for example, provide an estimate of the value of a house or of the value of a car. The custom valuation model may be a model designed entirely by a vendor or may be a combination of existing valuation models, such as those provided by zillow.com or housevalues.com. Combining multiple valuation models, with custom weights being given to each model, may provide a model that is more accurate for the vendor's purposes than simply relying on a single existing model. Accordingly, the system may advantageously allow a vendor to create a custom automated valuation model by specifying which existing models to include in a combination and a formula that calculates a valuation based on some combination (such as a weighted average) of the various valuations provided by the existing models. The custom automated valuation model can be included directly in a vendor's criteria, such as by excluding any consumer that is seeking to buy a house with an estimated valuation that is either too high or too low, or it can be included indirectly in a vendor's criteria, such as by using the automated valuation model to calculate a loan to value ratio that is, in turn, used in the vendor's criteria.

The foregoing examples of custom criteria are provided by way of example only and they do not limit the invention. A skilled artisan will appreciate, in light of this disclosure, that many other custom criteria may be used advantageously with the systems and methods disclosed herein. Custom criteria may include any criteria that is not provided as standard criteria but that the vendor desires to use to determine whether a consumer matches the vendor. The operator of the system 100 can add additional custom criteria proposed by any vendor, thus causing the criteria engine 105 and the matching engine 115 to execute the additional custom criteria when a vendor's plan calls for the execution of the custom criteria. Components embodying such additional custom criteria can be separate components that are called by the criteria engine 105 or matching engine 115, or such components can be incorporated as part of the criteria engine 105 or the matching engine 115.

The term "database," as used with respect to any of the databases disclosed herein, encompasses any group of data that stores information in an organized way. These databases need not require Structured Query Language ("SQL"), a relational database management system, or any other query language or database management system, for accessing the information stored therein. Moreover, these databases are not limited to any particular format. Rather, these databases may be simple text files that have an entry on each line or multiple entries on a single line separated by commas, tabs, semicolons, or the like. Alternatively, these databases may comprise all or portions of many computer files stored in one or more directories or folders.

We have described the foregoing embodiments by way of example and not limitation. A skilled artisan will appreciate, in light of this disclosure, that the invention is not limited to the disclosed embodiments, but encompasses the disclosed embodiments individually, combinations of features of the disclosed embodiments, and variations of the disclosed embodiments that are apparent to a skilled artisan in light of this disclosure. For example, a skilled artisan will appreciate that many of the features described herein can be modified or omitted from certain embodiments without departing from the invention.

We claim:

1. A computer system comprising:
   computer storage comprising at least one collection of data comprising:
   vendor criteria data representing standard criteria that are provided by the computer system to substantially all vendors having access to the computer system to allow the vendors to define types of consumers about whom the vendors are to receive leads;
   vendor custom criteria data representing at least one set of custom criteria, wherein each set of custom criteria is based upon at least one calculation that is proprietary to a particular vendor such that the set of custom criteria is reserved for the exclusive use of the particular vendor and other vendors associated with the system do not have access to the custom criteria, and the set of custom criteria is used to define types of consumers about whom the particular vendor is to receive leads; and
   vendor plan data representing a plurality of vendor plans, wherein each vendor plan defines which standard criteria and custom criteria is to be used for a vendor associated with the vendor plan and information that the associated vendor is to receive in leads transmitted to the vendor;
   computer hardware comprising at least one computer processor configured to execute software components that each comprise computer-executable instructions;
   a first software component configured, upon execution, to cause the computer processor to receive consumer data about a consumer;
   a second software component configured, upon execution, to cause the computer processor to choose standard criteria, custom criteria, or both standard criteria and custom criteria that are to be applied to the consumer data to match the consumer with one or more vendors that are to receive a lead for the consumer, wherein the chosen standard criteria, custom criteria, or both standard criteria and custom criteria depend at least in part on the vendor plan data;
   a third software component configured, upon execution, to cause the computer processor to apply the chosen standard criteria, custom criteria, or both standard criteria and custom criteria to the consumer data and to match the consumer with one or more vendors that are to receive a lead for the consumer;
   a fourth software component configured, upon execution, to cause the computer processor to generate a lead comprising at least a portion of the consumer data; and
   a fifth software component configured, upon execution, to cause the computer processor to transmit the lead to the matched vendors.

2. The system of claim 1, wherein at least one custom criterion comprises a custom credit score that is not a FICO score.

3. The system of claim 2, further comprising a sixth software component configured, upon execution, to cause the computer processor to calculate a custom credit score based at least in part on the consumer data.

4. The system of claim 1, wherein the generated lead further comprises custom data related to at least one custom criterion.

5. The system of claim 4, wherein at least one custom criterion comprises a custom credit score that is not a FICO score and wherein the custom data comprises a consumer's calculated custom credit score.

6. The system of claim 1, wherein the third software component causes the computer processor to match the consumer with more than one vendor and wherein a lead generated for at least one of the matched vendors has at least some data that is different from data in at least one lead generated for at least one other of the matched vendors.

7. The system of claim 1, wherein each vendor plans also defines an amount of money to be paid by the associated vendor to an operator of the system for each lead generated for and transmitted to the associated vendor based under the vendor plan.

8. A method comprising:
accessing a plurality of computer-readable instructions; and
executing the instructions on a computer system comprising computer hardware including at least one computer processor, wherein execution of the instructions by the computer processor causes the computer system to perform a plurality of operations comprising:
receiving consumer data about a consumer;
matching the consumer with one or more vendors based at least in part on comparing the consumer data with criteria defined in one or more vendor plans, wherein custom criteria that is customized for a particular vendor is applied to determine whether to match the consumer with the particular vendor if it is determined that a vendor plan associated with the particular vendor has custom criteria defined for the vendor plan, wherein the custom criteria is proprietary to the particular vendor such that the custom criteria is reserved for the exclusive use of the particular vendor and other vendors do not have access to the custom criteria;
generating one or more leads comprising at least a portion of the consumer data for each of the matched vendors, and for each matched vendor that has a vendor plan that requests that custom data be included with a lead, including the custom data in the lead for that vendor; and
transmitting the leads to the matched vendors.

9. The method of claim 8, wherein the custom criteria comprise criteria that are made available for use by some vendors but not all vendors.

10. The method of claim 8, wherein the custom criteria comprise criteria that are not commonly used across an industry but that are used by one or more individual vendors within the industry.

11. The method of claim 8, wherein the custom criteria comprise criteria that are based on data or methods of data interpretation that are unique or atypical in an industry.

12. The method of claim 8, wherein at least one custom criterion comprises a custom credit score that is not a FICO score.

13. The method of claim 12, wherein the operations performed by the computer system further comprise calculating a custom credit score based at least in part on the consumer data.

14. The system of claim 13, wherein including custom data in the lead for a vendor comprises including a calculated custom credit score of the consumer.

15. A method comprising:
accessing a plurality of computer-readable instructions; and
executing the instructions on a computer system comprising computer hardware including at least one computer processor, wherein execution of the instructions by the computer processor causes the computer system to perform a plurality of operations comprising:
receiving consumer data about a consumer;
determining at least one vendor plan that defines, for at least one vendor, criteria to be used to determine if the consumer matches the vendor;
determining, in accordance with the vendor plan, standard criteria, custom criteria, or both standard criteria and custom criteria to apply, wherein standard criteria is criteria that is made available to a plurality of vendors and wherein custom criteria is proprietary to a particular vendor such that the custom criteria is reserved for the exclusive use of the particular vendor and other vendors do not have access to the custom criteria;
matching the consumer with one or more vendors by applying the determined criteria;
determining, in accordance with the vendor plan, standard data, custom data, or both standard data and custom data to include in a lead for each matched vendor;
generating a lead for each vendor; and
transmitting the lead generated for each vendor to that vendor.

16. The method of claim 15, wherein one custom criterion that may be applied comprises a custom credit score that is not a FICO score.

17. The method of claim 15, wherein one custom criterion that may be applied comprises a custom propensity score.

18. The method of claim 17, wherein the custom propensity score comprises an indication of a degree of likelihood that a consumer will respond to a vendor's attempt to sell a product or service that is offered by the vendor.

19. The method of claim 17, wherein the custom propensity score comprises a prepayment score.

20. The method of claim 15, wherein one custom criterion that may be applied comprises a custom automated valuation model.

\* \* \* \* \*